Figure 1:
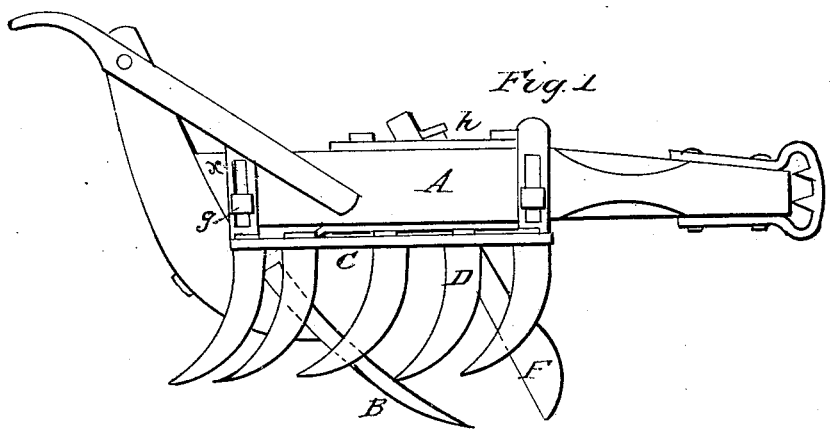
Figure 2:
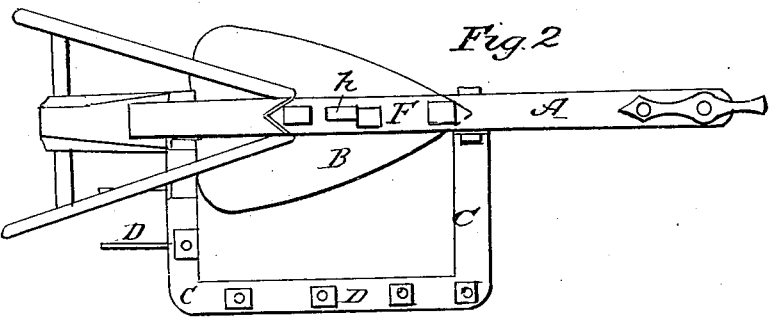

J. H. DICKSON.
Plow.

No. 81,148.

Patented Aug. 18, 1868.

UNITED STATES PATENT OFFICE.

J. H. DICKSON, OF ALFORD, INDIANA.

IMPROVEMENT IN PLOWS.

Specification forming part of Letters Patent No. 81,148, dated August 18, 1868.

*To all whom it may concern:*

Be it known that I, J. H. DICKSON, of Alford, in the county of Pike, and in the State of Indiana, have invented certain new and useful Improvements in Plows; and I do hereby declare that the following is a full, clear, and exact description thereof, reference being had to the accompanying drawings, and the letters of reference marked thereon.

In the annexed drawings, making a part of this specification, A and B represent a plow-beam and plow, respectively.

The plow B is made like an ordinary shovel-plow.

C represents a metallic plate, bent or made in the form shown in the drawings, the ends turned up and provided with slots $x\ x$. This plate C is adjustable, and may be regulated or set at any elevation desired by means of the bolts $g\ g$.

Along the outside and across the rear end of the plate C is secured a series of curved knives, D D, made all of the same length, or of different lengths, as may, in practice, be found most desirable. These knives and plate I call a "fender" or "screen" to protect the corn or other plants from being covered or broken by clods of earth. The knives D D are for the further purpose of cutting up clods, and working near young plants without danger of injuring said plants, and may be adjusted so as to work to any depth required.

F represents a colter adjusted in the beam A by means of a key, $h$, as shown.

Having thus fully described my invention, what I claim as new, and desire to secure by Letters Patent, is—

The adjustable plate C and the curved knives D D, when used in combination with a shovel or other plow, B, and its beam A, the several parts being constructed and arranged substantially as and for the purpose herein set forth.

In testimony that I claim the foregoing I have hereunto set my hand this 1st day of February, 1868.

J. H. DICKSON.

Witnesses:
    LEVI FERGUSON,
    MILES CHAMBERS.